US006496140B1

(12) United States Patent
Alastalo

(10) Patent No.: US 6,496,140 B1
(45) Date of Patent: Dec. 17, 2002

(54) METHOD FOR CALIBRATING A SMART-ANTENNA ARRAY RADIO TRANSCEIVER UNIT AND CALIBRATING SYSTEM

(75) Inventor: Ari Alastalo, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/818,396

(22) Filed: Mar. 27, 2001

(51) Int. Cl.[7] .......................... G01S 7/40; G01S 13/00; G01S 3/16; G01S 3/28

(52) U.S. Cl. ........................ 342/174; 342/189; 342/378

(58) Field of Search ................................ 342/174, 378, 342/189

(56) References Cited

U.S. PATENT DOCUMENTS

| | | | | |
|---|---|---|---|---|
| 5,274,844 A | * 12/1993 | Harrison et al. | .............. | 455/25 |
| 5,543,801 A | * 8/1996 | Shawyer | ...................... | 342/354 |
| 5,929,810 A | * 7/1999 | Koutsoudis et al. | ......... | 342/373 |
| 5,940,032 A | * 8/1999 | Passmann et al. | .......... | 342/372 |
| 6,037,898 A | * 3/2000 | Parish et al. | ................ | 342/174 |
| 6,295,027 B1 | * 9/2001 | Wixforth et al. | ............ | 342/368 |
| 6,411,257 B1 | * 6/2002 | Sorelius et al. | ............. | 342/378 |

OTHER PUBLICATIONS

Kentaro Nishimori, et al. "A new calibration method of adaptive array for TDD systems," Proc. Antennas and Propagation Society, IEEE International Symbosium, 1999, vol. 2, pp. 1444–1447.

* cited by examiner

*Primary Examiner*—Thomas H. Tarcza
*Assistant Examiner*—Brian Andrea
(74) *Attorney, Agent, or Firm*—Cohen, Pontani, Lieberman & Pavane

(57) ABSTRACT

The invention relates to a method for calibrating a smart-antenna array of a wireless access system using TDD, which antenna array comprises antenna elements with a transmit and a receive branch each. In order to enable a time stable calibration, it is proposed that at least some of the antenna elements are selected in turns to be employed for transmitting broadcast messages. This provides time periods in which only one of said elements is transmitting. Each transmit branch is connected to at least one of the receive branches of another element, signals transmitted via these connections being evaluated for calibration. If receive branches are connected to transmit branches of several elements, it is ensured with the proposed selection that during the broadcast periods these receive branches receive at the most a signal from one element, thus avoiding the need for switches. The invention equally relates to a corresponding radio transceiver unit and a corresponding calibration system.

12 Claims, 5 Drawing Sheets

METHOD FOR CALIBRATING A SMART-ANTENNA ARRAY RADIO TRANSCEIVER UNIT AND CALIBRATING SYSTEM

BACKGROUND OF THE INVENTION

1. Field of the Invention

The invention relates to a method for calibrating a smart-antenna array of a time division duplex (TDD) system, which smart antenna comprises an array of at least two antenna elements, each with a transmit (TX) and a receive (RX) radio frequency branch. The invention equally relates to a radio transceiver unit with a smart antenna array for a wireless access system using time division duplex, and to a calibrating system for calibrating a smart antenna array of a wireless access system using time division duplex.

2. Description of the Related Art

Smart antennas are known to be employed as transmit and receive antennas in wireless access systems, in particular in base stations of such systems. Smart antennas, which generally use an array of antenna elements, enable the output of fully steerable beams patterns. They can be employed for example for a user specific digital beamforming, in which a beamformer of the smart antenna array is able to weight phase angle and/or amplitude of the signals transmitted by different antenna elements of the array in a way that the direction of the beam is adapted to move along with a mobile terminal through the whole sector of coverage of the antenna array.

Smart, or adaptive, antennas offer several benefits for wireless communications systems. The directivity of smart antennas can be used for example to reduce the delay spread of a radio channel. Moreover, the diversity of the antenna guards against fading. When employed in a base station, the output power of mobile terminals served by the base station can be decreased due to the spatial gain, which results in a longer battery lifetime. Array antennas also serve to increase the range of base stations, and the interference power to and from neighboring cells can be lowered considerably, thus improving the signal-to-interference ratio and the overall network capacity. Finally, mobile terminals served by the same base station can be identified according to their spatial signatures. This enables to further increase capacity of the base station by serving several terminals in the same time slot in space division multiple access (SDMA) operation.

Since the smart-antenna algorithms are frequently implemented at the baseband, most smart antenna systems provide for each antenna element separate radio frequency (RF) components for transmission and for reception of signals in dedicated transmit and receive branches. The RF components of the different receive and transmit branches of the different antenna elements usually have different properties. If the differences between the antenna elements and between the different branches of each antenna element are not compensated by an array calibration, the gain of the smart antenna is degraded. Furthermore, these properties evolve differently in time, which makes a real-time calibration necessary.

Smart antennas can be employed e.g. in a time division duplex system, in which adaptive antennas are particularly effective, since the optimum pattern formed in reception mode can be used for determining an optimum transmission pattern. The properties of such a TDD system can be made use of for calibration. In a TDD system, the employed frequency channels are divided into time slots, which are alternatingly reserved for transmission in uplink and downlink direction. Therefore, there is always only one direction of transmission possible at a time. The TDD is realized by connecting alternatingly a transmit and a receive branch in each antenna element.

Kentaro Nishimori, Keizo Cho, Yasushi Takatori, and Toshikazu Hori propose in "A new calibration method of adaptive array for TDD systems," in Proc. Antennas and Propagation Society, IEEE International Symbosium, 1999, vol. 2, pp. 1444–1447, a method for calibrating a smart antenna array with a plurality of antenna element for TDD systems.

In this method, first a signal transmitted via the transmit branch of a first antenna element is divided by a directional coupler in the transmit branch. The signal is received via a switchable connection by the receive branches of each of the other antenna elements in turn. Then, signals transmitted via the transmit branches of each of the other antenna elements are divided by directional couplers in the respective transmit branch. Signals divided from one of these transmit branches after the other are received by the receive branch of the first antenna element by switching between corresponding connections. For the respective transmitted and received signals, the phase differences and gains are determined, which are then used for calculating for each antenna element a calibration value that can be used for correcting at the same time phase and gain in relation to a selected reference antenna element. Phase calibration and amplitude calibration are therefore combined. Due to the fact that the method is based on a TDD system, no signals from outside of the unit comprising the smart antenna array are received during the transmissions by the antenna elements. Therefor, the evaluated received signals result exclusively from the respectively evaluated transmitted signal of the antenna array.

It is an advantage of this method that in contrast to other known calibration methods, the calibration can be carried out during normal transmissions, using the signals transmitted during these normal transmissions as calibration signals. Therefore, no additional signal generator is needed and no transmission capacity is lost.

A disadvantage of the described calibration system, however, results from the switching used for selecting different antenna elements of the antenna array. The performance of active or semi active components like switches is varying in time, the consequence of which are unstable calibration results. Furthermore, an implementation using switches can be rather expensive.

SUMMARY OF THE INVENTION

It is an object of the invention to provide a method, a radio transceiver unit comprising a smart antenna array and a calibration system that enable a time stable calibration of a smart antenna array.

This object is reached on the one hand with a method for calibrating a smart-antenna array of a wireless access system using time division duplex, which smart antenna array comprises at least two antenna elements, each with a transmit and a receive radio frequency branch. The calibrating is based on the evaluation of signals transmitted via the transmit branch of one of the antenna elements and received via the receive branch of another one of the antenna elements respectively. The transmit and receive branches used for the respective transmission are physically interconnected. At least those transmit branches of antenna elements connected to a receive branch of an antenna element that is connected at the same time to a transmit branch of at least one other antenna element are employed in a predetermined order for transmitting broadcast messages in predetermined broadcast periods during which the respective other antenna elements are prevented from transmitting signals.

On the other hand, the object is reached with a radio transceiver unit for a wireless access system using time division duplex comprising a smart antenna array with at least two antenna elements, each including a transmit and a receive branch. In the transmit and the receive branch of each antenna element a directional coupler is provided for coupling signals out of the transmit branches and for coupling signals into the receive branches. Each coupler in the transmit branch of an antenna element is connected by a physical connection to the coupler in the receive branch of at least one other antenna element. Selection means are provided for selecting in a predetermined order at least each of those transmit branches of antenna elements connected to a receive branch of an antenna element that is connected at the same time to a transmit branch of at least one other antenna element to be employed for transmitting broadcast messages in predetermined broadcast periods during which the respective other antenna elements are prevented from transmitting signals. Finally, processing means are employed for evaluating signals transmitted via said connections for obtaining calibration information to be used for calibrating the smart antenna array.

Finally, the object is reached with a calibrating system for calibrating a smart antenna array with at least two antenna elements of a wireless access system using time division duplex, each antenna element including a transmit and a receive branch. The proposed calibration system comprises directional couplers, connections, selection means and processing means corresponding to those of the proposed radio transceiver unit.

The invention proceeds from the idea that in wireless access systems, usually broadcast periods are provided, in which periods the same information is transmitted to several recipients, and in which the regular point-to-point smart-antenna operation cannot be used. In situations where the element radiation patterns of the array cover the same angular space as the radiation pattern of the whole array, it is known to use only a single one of the antenna elements of the smart antenna array for transmitting broadcast messages during the predetermined broadcast periods. If in contrast and in accordance with the invention, the antenna element employed for transmitting the broadcast messages is varied, a receive branch of an antenna element can be connected in a fixed way to the transmit branches of up to all other antenna elements taking their turn in transmitting the broadcast message. During each broadcast period, the receive branches of the antenna elements of a smart antenna array in a TDD system then receive at the most a signal from the transmit branch of the antenna element currently used for transmitting the broadcast message. Thus, switches in the calibration system are not necessary. Avoiding switches results in an improved calibration since only passive components are required, the properties of which practically do not change in time. Moreover, an expensive implementation of switches is avoided.

At the same time, there is no need for a dedicated generation of calibration signals and for the provision of a time period that can be used exclusively for calibration, since the signals transmitted anyhow as broadcast messages can be used as basis for calibration measurements, and, depending on the configuration, possibly partly as well signals transmitted during smart antenna operation.

Preferred embodiments of the invention become apparent from the subclaims.

In a first preferred embodiment, transmitted and received signals are evaluated by determining only the phase difference between them. These phase differences are then used for determining a value for a phase calibration of each antenna element. Phase calibration alone can be sufficient, if only the power received by or from some other radio transceiver unit is to be maximized. From the implementation point of view, doing phase calibration only might in some situations be easier.

In an advantageous implementation of the invention, a value for a phase calibration for each antenna element is determined by fixing a calibration phase for one of the N antenna elements to a value $\hat{B}_1$ and by adjusting the phases of the N−1 further antenna elements with calibration phases $\hat{B}_2$ to $\hat{B}_N$ determined relative to the fixed value. For the transmitted and received signals, the respective phase difference $\Delta_{ij}$ is then determined. The first index identifies the respective transmitting and the second index the respective receiving antenna element. Both indices i,j lie between 1 and N. For a particularly simple determination of calibration phases, pairs of phase differences $\Delta_{ij}$, $\Delta_{ji}$ are determined, each antenna element being represented in at least one of these pairs. For example, it would be sufficient to determine the phase differences $\Delta_{1j}$, with j=2 to N, of signals transmitted by the first element and received by each of the other elements, and the phase differences $\Delta_{i1}$, with i=2 to N, of signals received by the first elements after having been transmitted by each of the other elements.

In a next step of this implementation, calibration phases $\hat{B}_2$ to $\hat{B}_N$ are determined based on the one hand on suitable equations $\hat{B}_j-\hat{B}_i=\hat{x}_i-\hat{x}_j-(\hat{y}_i-\hat{y}_j)$, the hat ^ denoting the phase of the respective variable, wherein $x_i$ is the transfer function of the transmit branch of the $i^{th}$ antenna element and wherein $y_j$ is the transfer function of the receive branch of the $j^{th}$ antenna element, and based on the other hand on suitably determined phase differences $\Delta_{ij}$, the phase differences $\Delta_{ij}$ corresponding to $\hat{x}_i+\hat{y}_j$ and the indices i,j lying between 1 and N. In case pairs of phase differences $\Delta_{ij}$, $\Delta_{ji}$ and were determined as proposed above, for example, the solving of equations $\hat{B}_j-\hat{B}_i=\Delta_{ij}-\Delta_{ji}$ immediately results in the desired values for the phase calibrations of the different antenna elements.

In another preferred embodiment, transmitted and received signals are evaluated by determining alternatively or in addition to the phase differences the gains of the signals on the respective transmission path. These gains can be used for determining a value for an amplitude correction for each of the antenna elements.

An amplitude calibration is needed in particular, if the smart antenna array is to be calibrated for nulling, i.e. for placing nulls in the radiation pattern of the array for some directions.

In a preferred embodiment of the invention in which an amplitude calibration is to be carried out, first, transmitted and received signals are evaluated by determining the gain $\Delta_{ij}^a$ of the respective received signal compared to the respective transmitted signal. The first index identifies the respective transmitting antenna element and the second index identifies the respective receiving antenna element, both indices i,j lying between 1 and N, wherein N is the number of the at least two antenna elements of the array. Then, factors $|B_n|$, with n=1 to N, are determined for an amplitude correction for each of the N antenna elements based on the determined gains $\Delta_{ij}^a$ and on the equations:

$$|B_n| = \frac{|x_1||y_n|}{|x_n||y_1|}, \quad n = 1 \text{ to } N.$$

Corresponding to the proposed equations for determining values for the phase calibration, $x_n$ is the transfer function of the transmit branch of the $n^{th}$ antenna element, and $y_n$ the transfer function of the receive branch of the $n^{th}$ antenna element. Since each determined gain $\Delta_{ij}^{a}$ corresponds to $|x_i||y_j|$, the equations can be solved easily, if suitable and sufficient gains $\Delta_{ij}^{a}$ are determined. More specifically, the gains $\Delta_{ij}^{a}$ are equal to $|x_i||y_j|$ except for some multiplicative values resulting from the amplitude of the transfer functions of components on the transmit path between a respective transmit branch and a respective receive branch. These transfer functions can be supposed to be known.

The employment of the invention can be seen in particular, though not exclusively, in wireless local area networks (WLAN), like IEEE 802.11a and HIPERLAN/2 (high-performance local-area network) networks, and in wireless rooftop routers (WRR).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
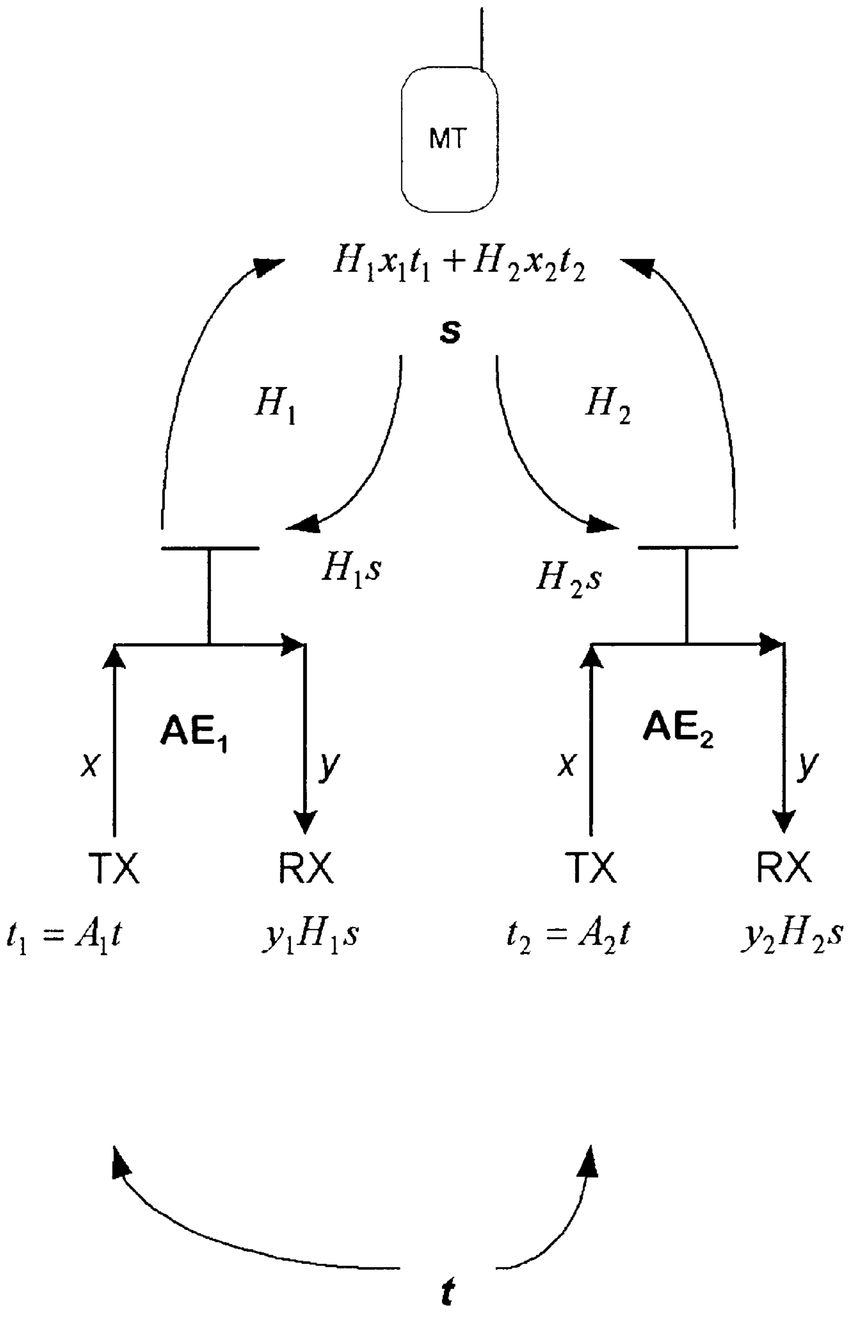
FIG. 1 illustrates the influence of different transfer properties on signals transmitted between a smart antenna array and a mobile terminal.

FIG. 1 schematically shows a part of a wireless communications system using TDD.

Of the wireless communications system, two antenna elements $AE_1$, $AE_2$ of a smart antenna system and a mobile terminal MT are depicted. The smart antenna system is implemented in a base station of a radio access network. Each of its antenna elements $AE_1$, $AE_2$ comprises a transmit TX and a receive RX radio frequency branch between which can be switched for transmission and reception. The transmit TX branches are connected within the base station to a common transmitter (not shown) operating at the baseband, and the receive RX branches are connected to a common receiver (not shown) operating at the baseband. The mobile terminal MT, which is located in the serving area of the base station, only uses a single antenna element. The transfer functions, or properties, of the radio channel between the first antenna element $AE_1$ and the mobile terminal MT are referred to as $H_1$, and the transfer properties of the radio channel between the second antenna element $AE_2$ and the mobile terminal MT are referred to as $H_2$ .

FIG. 1 is used to explain the influence of different transfer properties of a smart antenna array on signals transmitted between antenna elements $AE_1$, $AE_2$ of the smart antenna and a mobile terminal MT, and for deducing equations that can be employed for determining calibration values suited for compensating the differences in the transfer properties in different transmission paths. More specifically, based on FIG. 1 an equation is deduced that can be employed for a calibration of two antenna elements $AE_1$, $AE_2$ for the case that only the power received by a mobile terminal MT in downlink transmission and from a mobile terminal MT in uplink transmission is to be maximized. For such an optimization only a phase calibration is needed. However, the results can be used in general to reduce the phase calibrations of N>2 antenna elements to N−1 two-antenna phase calibrations.

The idea is to calibrate all antenna elements $AE_1$, $AE_2$ of an antenna array with respect to one of the antenna elements $AE_1$ of the array, this antenna element $AE_1$ being referred to as reference antenna element. In the described examples, it will always be the first antenna element $AE_1$ that is selected as reference antenna element.

All variables that will be mentioned with reference to FIG. 1, such as the radio channels $H_1$ and $H_2$, are complex numbers. FIG. 1 can be considered to be representing the signals in the frequency domain, such that the time-domain convolution of the radio channel with a transmitted signal as well as the convolution of the transfer function of a RF circuit with a signal are replaced by complex multiplications in the frequency domain. This is, especially, natural for OFDM (orthogonal frequency division multiplexing) systems such as 5 GHz WLANs and WRRs. However, this way of representing the signals does not restrict the generality of the results which are equally applicable in systems that do not use OFDM, as long as TDD operation is given. For OFDM systems, the calibration corrections can be calculated separately for each of the frequency-domain subcarriers. It is, however, likely that the calibration correction is not frequency dependent and thus the same result should be obtained for all subcarriers. Under such circumstances one can reduce noise effects and other possible errors in the calculation of the calibration correction by suitably averaging out the frequency degrees of freedom.

The mobile terminal MT first transmits a training signal s, which propagates through the radio channels with transfer properties $H_1$, $H_2$ such that signals $H_1s$ and $H_2s$ arrive at the antenna elements $AE_1$ and $AE_2$. Usually, the training signal s is a part of a packet, in particular a part in the beginning of a packet, that also contains payload data. The transmission takes place during a period that is assigned in the TDD system as transmit period for the mobile terminal MT and as receive period for the base station. The arriving signals $H_1s$ and $H_2s$ are forwarded by the antenna elements $AE_1$ and $AE_2$ to the baseband receiver of the base station. Since the training signal s is known to the receiver, the receiver is able to perform a channel estimation based on the known transmitted training signal s and on the received signal. The resulting channel estimates $h_1$, $h_2$ can be used to receive other signals than s with a correct consideration of the properties of the radio channels $H_1$, $H_2$.

However, the transmit TX and receive RX branches of the antenna elements $AE_1$, $AE_2$ have their own transfer functions or properties that are applied on all signals passing them. These transfer properties are denoted as $x_i$ and $y_i$ with the antenna element index, i, as subscript. At the baseband receiver, thus signals $y_1H_1s$ and $y_2H_2s$ are provided. Therefore, the channel estimates $h_1$ and $h_2$ which are determined in the receiver do not estimate only the radio channels $H_1$ and $H_2$, but instead the products $y_1H_1$ and $y_2H_2$, where $y_1$ and $y_2$ are unknown.

In the downlink, the base station transmits a signal t. The signal is transmitted in a time period that is assigned in the TDD system to transmissions by the base station and reception by mobile terminals MT. The signal t is weighted with different weights $A_1$, $A_2$ for the different antenna elements $AE_1$, $AE_2$ such that a first signal $t_1=A_1t$ is transmitted from the antenna element $AE_1$ and a second signal $t_2=A_2t$ from the antenna element $AE_2$. Before the channel propagation, which implies again a multiplication with $H_1$ and $H_2$, however, $t_1$ and $t_2$ are multiplied by the corresponding transfer functions $x_1$ and $x_2$ of the transmit TX branches of the antenna elements $AE_1$, $AE_2$. In the antenna of the mobile terminal MT, the signals from the different base station antenna elements $AE_1$, $AE_2$ are summed to $H_1x_1t_1+H_2x_2t_2$. The coherence requirement maximizing the reception power is that the components in the sum, $H_1x_1t_1$ and $H_2x_2t_2$, have to have the same phase. In other words, it is required that:

$$H_1x_1t_1=R\times H_2x_2t_2,\ R\in\mathfrak{R}, \tag{1}$$

where R is a real number. It is evident that if all the antenna elements in an array of more than two antenna elements meet this requirement with respect to the reference antenna element $AE_1$, the indices on the right hand side of the equation (2) changing according to the index of the respective antenna element, signals from all the antenna elements add up coherently. Consequently, for maximizing the desired user power, it is only necessary to consider the two-antenna scenario of FIG. 1.

For an ideal systems that has identical transfer properties in each receive RX and transmit TX branch and therefore does not need calibration, it is possible to set $x_i=y_i=1$ for $i=1,2,3,\ldots$ In this case, it can be seen easily that the coherence criterion of equation (1) is fulfilled with $A_i=h_i^*=H_i^*$. For a realistic system, $A_i$ is set to $h_i^*B_i$, where $B_i$ is the calibration correction for the $i^{th}$ antenna element. After a few simple steps of algebraic manipulation, starting from equation (1), it becomes apparent that this equation is equivalent to the requirement for the phases:

$$\hat{B}_2-\hat{B}_1=\hat{x}_1-\hat{x}_2-(\hat{y}_1-\hat{y}_2), \tag{2}$$

where the hat ^ denotes the phase of the corresponding variable. The phase $\hat{B}_1$, corresponding to the reference antenna element $AE_1$, can be selected arbitrarily, since absolute phase values are not of relevance, only the relative phases of the antenna elements $AE_1$, $AE_2$, being of importance. After that, equation (2) gives the calibration phases for the other antenna elements, in the example of FIG. 1 only for antenna element $AE_2$.

Figure 2:
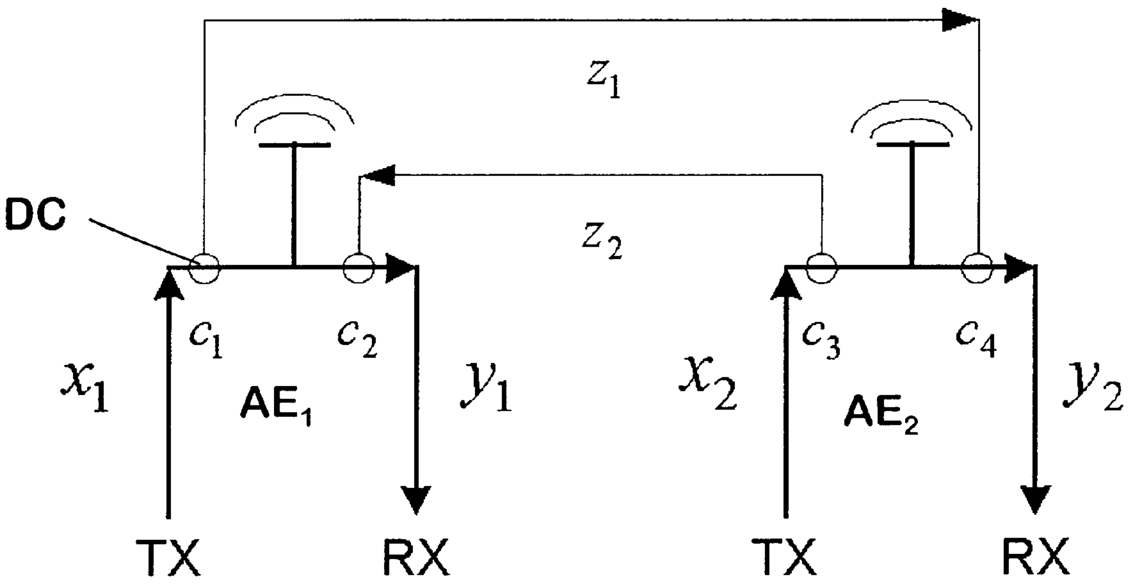
FIG. 2 shows a smart antenna system with two antenna elements connected for calibration.
Figure 3:
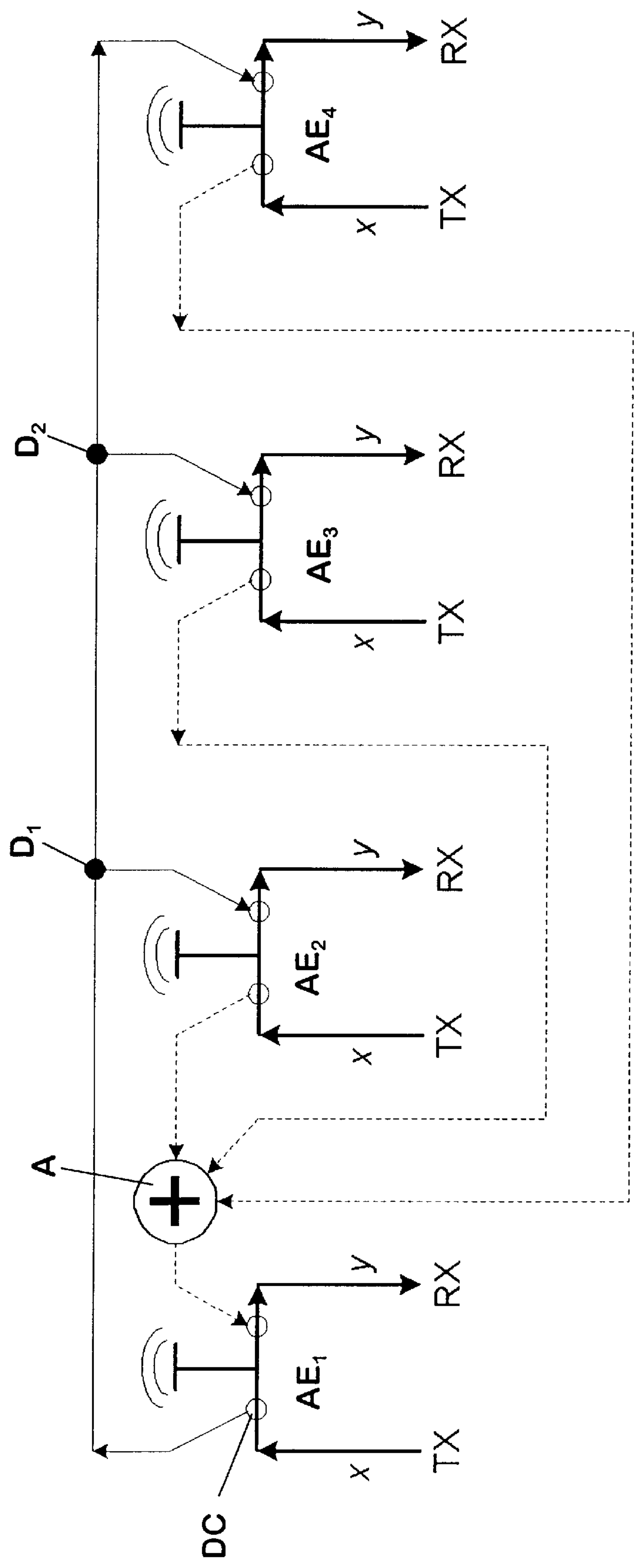
FIG. 3 shows a first embodiment of a radio transceiver unit of the invention with a smart antenna array comprising four antenna elements.
Figure 4:
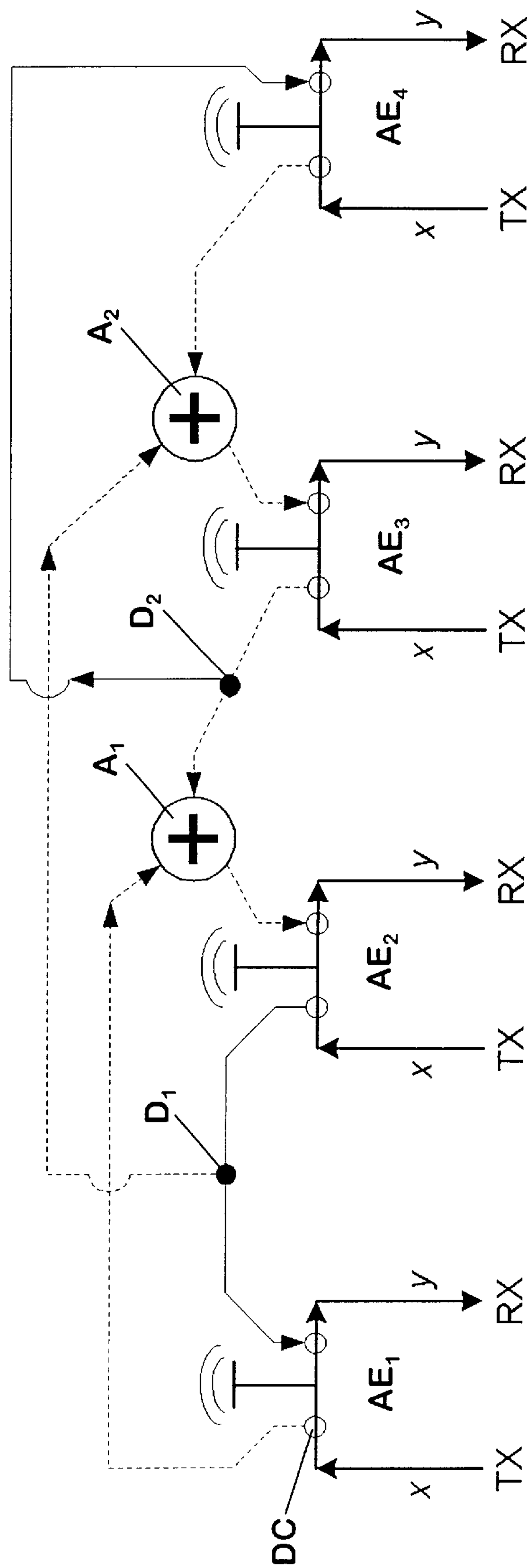
FIG. 4 shows a second embodiment of a radio transceiver unit of the invention with a smart antenna array comprising four antenna elements.

To solve this equation (2), it is not necessary to measure signals on all possible connections of transmit TX branches and receive RX branches. FIGS. 2 to 4 illustrate possibilities of measuring and evaluating signals that are suitable and sufficient to solve equation (2) for a phase calibration of all employed antenna elements.

FIG. 2 shows a smart antenna array with again only two antenna elements $AE_1$, $AE_2$. The two elements $AE_1$, $AE_2$ correspond to the two elements $AE_1$, $AE_2$ of FIG. 1, but they are supplemented by means for calibration.

In each receive RX and transmit TX branch of the antenna elements $AE_1$, $AE_2$, a directional coupler DC is integrated. The direction of coupling of each coupler DC is indicated by arrows. The couplers DC in the transmit TX branches suited to couple samples of signals out of the respective transmit TX branch, and the couplers DC in the receive RX branches are suited to couple samples of signals into the respective receive RX branch. The coupler DC in the transmit TX branch of the first antenna element $AE_1$ is connected with calibration cables to the coupler DC in the receive RX branch of the second antenna element $AE_2$. The coupler DC in the transmit TX branch of the second antenna element $AE_2$, in turn, is connected with calibration cables to the coupler DC in the receive RX branch of the first antenna element $AE_1$. Between the sample taking coupler and the sample-inserting coupler in the branches of the antenna elements $AE_1$, $AE_2$, there are only components that are common to the receive RX and transmit TX branches, except for cables or leads of which the properties are known and do not change.

In the depicted antenna array, an alternating use of antenna elements $AE_1$, $AE_2$ for transmitting broadcast messages is not required, since there are only two possible connections, namely the ones that are shown. Therefore, at no receive RX branch signals resulting from more that one transmit TX branch of another antenna element can be received simultaneously. Still, the calculation of calibration values based on detected signals is equivalent to the calculation for antenna arrays with more antenna elements, in which a superposition of signals is to be avoided according to the invention. Therefore, the antenna array of FIG. 2 is used as first and most simple example for said calculations.

During a downlink transmission, a sample is taken from the downlink signal in the transmit TX branch of one of the antenna elements $AE_1$, $AE_2$ by making use of the coupler DC in this branch, and led to the receive RX branch of the other antenna element $AE_2$, $AE_1$ via the connecting calibration cables, where it is received via the coupler DC in said receive RX branch. This process is carried out in both directions, the complete way of the respective signal samples being indicated by arrows. Proceeding from the measured signals, it is thus possible to determine the phase rotations $\Delta_{12}$, $\Delta_{21}$, and the amplitude gains $\Delta_{12}^a$, $\Delta_{21}^a$ resulting during the transmissions, the phase rotations and the amplitude gains being composed of the individual properties of all components passed on the respective transmission path:

$$\begin{cases}\Delta_{12}=\hat{x}_1+\hat{y}_2+c_1+z_1+c_4, & \Delta_{12}^a=|x_1||y_2||c_1||z_1||c_4| \\ \Delta_{21}=\hat{x}_2+\hat{y}_1+c_3+z_2+c_2, & \Delta_{21}^a=|x_2||y_1||c_3||z_2||c_2|,\end{cases}$$

where c1 to c4 are the transfer properties of the directional couplers DC, and z1, z2 the transfer properties of the calibration cables that are used on the transmission path in the respective direction. The lines || denote the amplitude of the corresponding variable. In the following, the properties of the directional couplers DC and the calibration cables will be assumed to be known. Consequently, the corresponding variables are not shown any more in the equations. The preceding equation can thus be rewritten as:

$$\begin{cases} \Delta_{12} = \hat{x}_1 + \hat{y}_2, & \Delta_{12}^a = |x_1||y_2| \\ \Delta_{21} = \hat{x}_2 + \hat{y}_1, & \Delta_{21}^a = |x_2||y_1|, \end{cases} \quad (3)$$

These equations (3) provide sufficient information for substituting the right-hand side of equation (2) with values known from the carried out measurements:

$$\hat{B}_2 - \hat{B}_1 = \Delta_{12} - \Delta_{21}. \quad (4)$$

Since the phase $\hat{B}_1$ of the first antenna element $AE_1$ has been fixed, the relative calibration phase $\hat{B}_2$ for the second antenna element $AE_2$ is now known. The fixed and the determined phases $\hat{B}_1$, $\hat{B}_2$ are then used corresponding to the above description of FIG. 1 for determining the factors $A_1$, $A_2$ with which a downlink signal t is to be distributed for transmission to the two antenna elements $AE_1$, $AE_2$.

The calibration of an array with two antenna elements can be carried out completely during the normal smart-antenna operation, taking samples of the signals transmitted during such operation, since the smart antenna array is supposed to be employed in a TDD system. Therefore, the transmission of the signals that are to be evaluated are transmitted during a period reserved in the system for the base station for transmissions. The receiving antenna element $AE_1$, $AE_2$ can therefore not receive any other signals at the same time from outside of the base station that would disturb the measurement of the signals received from the respective other antenna element $AE_2$, $AE_1$. On the other hand, an alternating use of the antenna elements $AE_1$, $AE_2$ for transmitting broadcast messages might be desirable for two-element arrays also in order to avoid intra-antenna coupling of power from TX branch to RX branch during calibration measurements. Furthermore, enough suppression has to be guaranteed for the mutual-coupling power entering an antenna element that is not used for broadcast transmission but for which a calibration measurement is being performed. It is thus of importance, for example, to leave the TX-RX switch (if switch solution is used), bypassed by the calibration connection, of the antenna element for which the measurement is being performed and that is not transmitting the broadcast message to TX position.

The amplitude gains in equation (3) can be used for an amplitude calibration that is needed for nulling. An example of an amplitude calibration will be described later on with reference to FIG. 5.

FIG. 3 shows four antenna elements $AE_1$–$AE_4$ of a smart antenna array employed in a base station of a TDD system, and a first possibility of connecting the antenna elements $AE_1$–$AE_4$ for transmitting signals that are to be evaluated for calibrating the antenna array.

Like the antenna elements $AE_1$, $AE_2$ of FIGS. 1 and 2, each of the four antenna elements $AE_1$–$AE_4$ has a transmit TX and a receive RX branch. Again, a directional coupler DC is included in each branch of each antenna element $AE_1$–$AE_4$, the functioning of the couplers DC corresponding to the functioning of those in FIG. 2.

The coupler DC in the transmit TX branch of the first antenna element $AE_1$ is connected via a first 2-to-1 divider $D_1$ to the coupler DC in the receive RX branch of the second antenna element $AE_2$. The second output of the first 2-to-1 divider $D_1$ is connected via a second 2-to-1 divider $D_2$ to the coupler DC in the receive RX branch of the third antenna element $AE_3$. Finally, the second output of the second 2-to-1 divider $D_2$ is connected the coupler DC in the receive RX branch of the fourth antenna element $AE_4$. These connections are shown in FIG. 3 as solid lines. Alternatively, a single 3-to-1 divider could be used to connect the coupler DC in the transmit TX branch of the first antenna element $AE_1$ to the couplers in each of the receive RX branches of the other antenna elements $AE_2$–$AE_4$.

On the other hand, the couplers DC in the transmit TX branches of the second, third and fourth antenna element $AE_2$–$AE_4$ are connected via a 3-to-1 combiner C or adder to the coupler DC in the receive RX branch of the first antenna element $AE_1$. These connections are in FIG. 3 shown as dashed lines.

All connections are realized again with calibration cables.

The forward, i.e. left-to-right, transmission paths of the calibration system of FIG. 3, which are depicted with solid lines, can be used as the transmission paths in FIG. 2 during the directional smart-antenna operation. In this operation, the transmit TX branches transmit dedicated information that is destined for mobile terminals MT in the serving area of the base station. Since the system is supposed to be a TDD system, the transmission takes place during one of the transmission periods assigned to the base station. Before the information is transmitted via the air interface, a sample of the signal transmitted by the first antenna element $AE_1$ is coupled out by the coupler DC in the transmit TX branch of the first antenna element $AE_1$. The signal that was coupled out is then provided via the 2-to-1 dividers $D_1$, $D_2$ to the receive RX branches of the second, third and fourth antenna element $AE_2$–$AE_4$. These antenna elements $AE_2$–$AE_4$ are not able to receive any other signals at the same time that would be superposed on the signals received from the first antenna element $AE_1$, since they are received during the transmit period of the base station, the receive RX branches of the antenna elements $AE_1$–$AE_4$ not being switched for reception. On the other hand, the measurements for the solid lines in FIG. 3, however, are best carried out as well during a broadcast transmission from antenna element $AE_1$ only. This is, as mentioned with reference to the case of FIG. 2 with only two antenna elements, in order to avoid intra-antenna coupling of power from TX branch to RX branch during calibration measurements. Furthermore, enough suppression has to be guaranteed for the mutual-coupling power entering an antenna element that is not used for broadcast transmission but for which a calibration measurement is being performed. It is thus of importance, for example, to leave the TX-RX switch (if switch solution is used), bypassed by the calibration connection, of the antenna element for which the measurement is being performed and that is not transmitting the broadcast message to TX position.

The transmitted signal and the corresponding received signals are detected and the respective phase difference $\Delta_{12}$, $\Delta_{13}$, $\Delta_{14}$, and the respective gain $\Delta_{12}^a$, $\Delta_{13}^a$, $\Delta_{14}^a$ is determined for each transmission path. As in the configuration of FIG. 2, the resulting phase rotations and amplitude gains can be related again to the phase and the amplitude of the transfer properties of the passed transmit TX and receive RX branches of the antenna elements $AE_1$–$AE_4$, known properties of directional couplers DC, calibration cables, power dividers $D_1$, $D_2$ and combiners C being omitted:

The backward, i.e. the right-to-left transmission paths of the calibration system, which are depicted with dashed lines in FIG. 3, on the other hand, are used during the broadcast periods, in which in turn one of the second, third and fourth antenna elements $AE_2$–$AE_4$ is used as broadcast antenna element, while the respective other antenna elements $AE_1$–$AE_4$ do not transmit.

Considering the dashed lines in FIG. 3, during broadcast periods, the antenna element $AE_2$–$AE_4$ currently used as broadcast antenna element transmits information that is to be transmitted to all mobile terminals MT in the serving area of the base station. Before being transmitted via the air interface, a sample of the signal transmitted by the respective broadcast antenna element $AE_2$–$AE_4$ is coupled out by the coupler DC in the transmit TX branch of this antenna element. The sample that was coupled out is then provided via the combiner C to the receive RX branch of the first antenna element $AE_1$. The first antenna element $AE_1$ does not receive any other signals at the same time that would be superposed on the signal received from the respective broadcast antenna element $AE_2$–$AE_4$, since they are received during the transmit period of the base station and since, due to the broadcast operation, there are no signals transmitted at the same time via the other connections to the coupler DC in the receive RX branch of the first antenna element $AE_1$. The same process is repeated during the following broadcast periods with the other antenna elements $AE_2$–$AE_4$ being used in turn as broadcast antenna element. Again, enough suppression has to be guaranteed for the mutual-coupling power entering antenna element $AE_1$ that is not used for broadcast transmission but for which a calibration measurement is being performed. It is thus of importance, for example, to leave the TX-RX switch (if switch solution is used), bypassed by the calibration connection, of antenna element $AE_1$ for which the measurement is being performed and that is not transmitting the broadcast message to TX position.

The signals transmitted and received during the broadcast periods are detected and the respective phase difference $\Delta_{21}$, $\Delta_{31}$, $\Delta_{41}$, and the respective gain $\Delta_{12}{}^a$, $\Delta_{13}{}^a$, $\Delta_{14}{}^a$ are determined for each transmission path. With these values, the rest of the needed equations defining the transfer properties of the passed transmit TX and receive RX branches of the antenna elements $AE_1$–$AE_4$ is given by:

$$\begin{cases} \Delta_{21} = \hat{x}_2 + \hat{y}_1, & \Delta_{21}^a = |x_2||y_1| \\ \Delta_{31} = \hat{x}_3 + \hat{y}_1, & \Delta_{31}^a = |x_3||y_1| \\ \Delta_{41} = \hat{x}_4 + \hat{y}_1, & \Delta_{41}^a = |x_4||y_1|. \end{cases} \quad (6)$$

With results (5) and (6), the phases of the calibration corrections $\hat{B}_i$, $i \in \{2,3,4, \ldots\}$ can be determined for the second to fourth antenna element $AE_2$–$AE_4$ relative to the value $\hat{B}_1$, which is fixed as phase for the reference antenna $AE_1$. More specifically, the calibration phases are determined with equations corresponding to equation (4), in which the index 2 is substituted in turn by 2, 3 and 4.

It is to be noted that all the components of the calibration system of FIG. 3 are passive, needing no external control. The main point enabling a configuration without switches, which results in better linearity properties, is the fact that a broadcast period is provided in the communication system during which the directional smart-antenna transmission cannot be used. Instead, during each broadcast period only one of the antenna elements $AE_1$–$AE_4$ is used for transmitting broadcast messages.

The calibration of four antenna elements $AE_1$–$AE_4$ illustrated in FIG. 3 can be generalized in a straightforward manner to any other number of antenna elements.

FIG. 4 shows four antenna elements $AE_1$–$AE_4$ of a further smart antenna array employed in a base station of a TDD system, and a second possibility of connecting such antenna elements $AE_1$–$AE_4$ for transmitting signals that are to be evaluated for a calibration of the antenna array.

Again, each of the four antenna elements $AE_1$–$AE_4$ has a transmit TX and a receive RX branch with an included directional coupler DC, the respective coupling direction being indicated again by arrows.

The coupler DC in the transmit TX branch of the second antenna element $AE_2$ is connected via a first 1-to-2 divider $D_1$ to the coupler DC in the receive RX branch of the first antenna element $AE_1$. Further, the coupler DC in the transmit TX branch of the third antenna element $AE_3$ is connected via a second 1-to-2 divider $D_1$ to the coupler DC in the receive RX branch of the fourth antenna element $AE_4$. These two connections are shown in FIG. 4 as solid lines.

Moreover, the coupler DC in the transmit TX branch of the first antenna element $AE_1$ as well as the coupler DC in the transmit TX branch of the third antenna element $AE_3$ via the second output of the second 1-to-2 divider $D_2$ are connected via a first 2-to-1 combiner $C_1$ to the coupler DC in the receive RX branch of the second antenna element $AE_2$. Finally, the coupler DC in the transmit TX branch of the second antenna element $AE_2$ via the second output of the first 1-to-2 divider $D_1$ as well as the coupler DC in the transmit TX branch of the fourth antenna element $AE_4$ are connected via a second 2-to-1 combiner $C_2$ to the coupler DC in the receive RX branch of the third antenna element $AE_3$. These four connections are shown in FIG. 4 as dashed lines.

All connections are realized again with calibration cables.

The connections in FIG. 4 allow to determine phase differences between transmitted signals and received signals that are different from those determined with the connections in FIG. 3, but that are equally suited to solve the necessary variations of equation (2).

Like in FIG. 3, the phase differences $\Delta_{12},\Delta_{21},\Delta_{23},\Delta_{32},\Delta_{34},\Delta_{43}$ between transmitted signals and received signals and the gains $\Delta_{12}{}^a,\Delta_{21}{}^a,\Delta_{23}{}^a,\Delta_{32}{}^a,\Delta_{34}{}^a,\Delta_{43}{}^a$ of the signals on the transmission path are determined for all shown connections.

The resulting values for the phase differences and the gains can again be written in terms of the phase and amplitude of the transfer properties x, y of the respective passed transmit TX and receive RX branches, the indices corresponding again to the number of the respective antenna element $AE_1$–$AE_4$:

$$\begin{cases} \Delta_{12} = \hat{x}_1 + \hat{y}_2, & \Delta_{12}^a = |x_1||y_2| \\ \Delta_{21} = \hat{x}_2 + \hat{y}_1, & \Delta_{21}^a = |x_2||y_1| \\ \Delta_{23} = \hat{x}_2 + \hat{y}_3, & \Delta_{23}^a = |x_2||y_3| \\ \Delta_{32} = \hat{x}_3 + \hat{y}_2, & \Delta_{32}^a = |x_3||y_2| \\ \Delta_{34} = \hat{x}_3 + \hat{y}_4, & \Delta_{34}^a = |x_3||y_4| \\ \Delta_{43} = \hat{x}_4 + \hat{y}_3, & \Delta_{43}^a = |x_4||y_3| \end{cases} \quad (7)$$

Here, however, only the phase difference and gains $\Delta_{21}$, $\hat{\Delta}_{21}$,$\Delta_{34}$,$\hat{\Delta}_{34}$ of the signals transmitted via two of the connections, i.e. from the coupler DC of the transmit TX branch of the second antenna element $AE_2$ to the coupler DC of the receive RX branch of the first antenna element $AE_1$ and from the coupler DC of the transmit TX branch of the third antenna element $AE_3$ to the coupler DC of the receive RX branch of the fourth antenna element $AE_4$, can be found during the smart-antenna operation. The connections are those depicted as solid lines. The other values that are based on signals transmitted via the connections depicted as dashed lines are obtained during single-antenna broadcasts as described with reference to FIG. 3. Note that in this configuration, each of the antenna elements $AE_1$–$AE_4$, also the first one, has to be used in turns for transmitting a broadcast message.

From equation (7), a sufficient number of equations corresponding to equation (2) can be set up for determining the calibration phases:

$$\hat{B}_2-\hat{B}_1=\Delta_{12}-\Delta_{21}, \hat{B}_3-\hat{B}_2=\Delta_{23}-\Delta_{32}, \hat{B}_4-\hat{B}_3=\Delta_{34}-\Delta_{43} \quad (8)$$

The calibration phases are determined sequentially, and not in each equation with respect to a single reference phase $\hat{B}_1$, as in the example of FIG. 3. Again, however, one of the phases in equation (8), for example again the phase $\hat{B}_1$ for the first antenna element $AE_1$, has to be fixed so that the other phase values $\hat{B}_2$–$\hat{B}_4$ are determined in relation to the fixed value $\hat{B}_1$.

A main difference between the calibration systems of FIGS. 3 and 4 is that in FIG. 4 there are two 2-to-1 combiners $C_1$, $C_2$ instead of one 3-to-1 combiner C and that there is no longer the possibility of substituting the two 1-to-2 dividers $D_1$, $D_2$ with one 1-to-3 divider.

An amplitude calibration of a smart antenna array of a base station in a TDD system is now explained with reference to FIG. 5.

Figure 5:
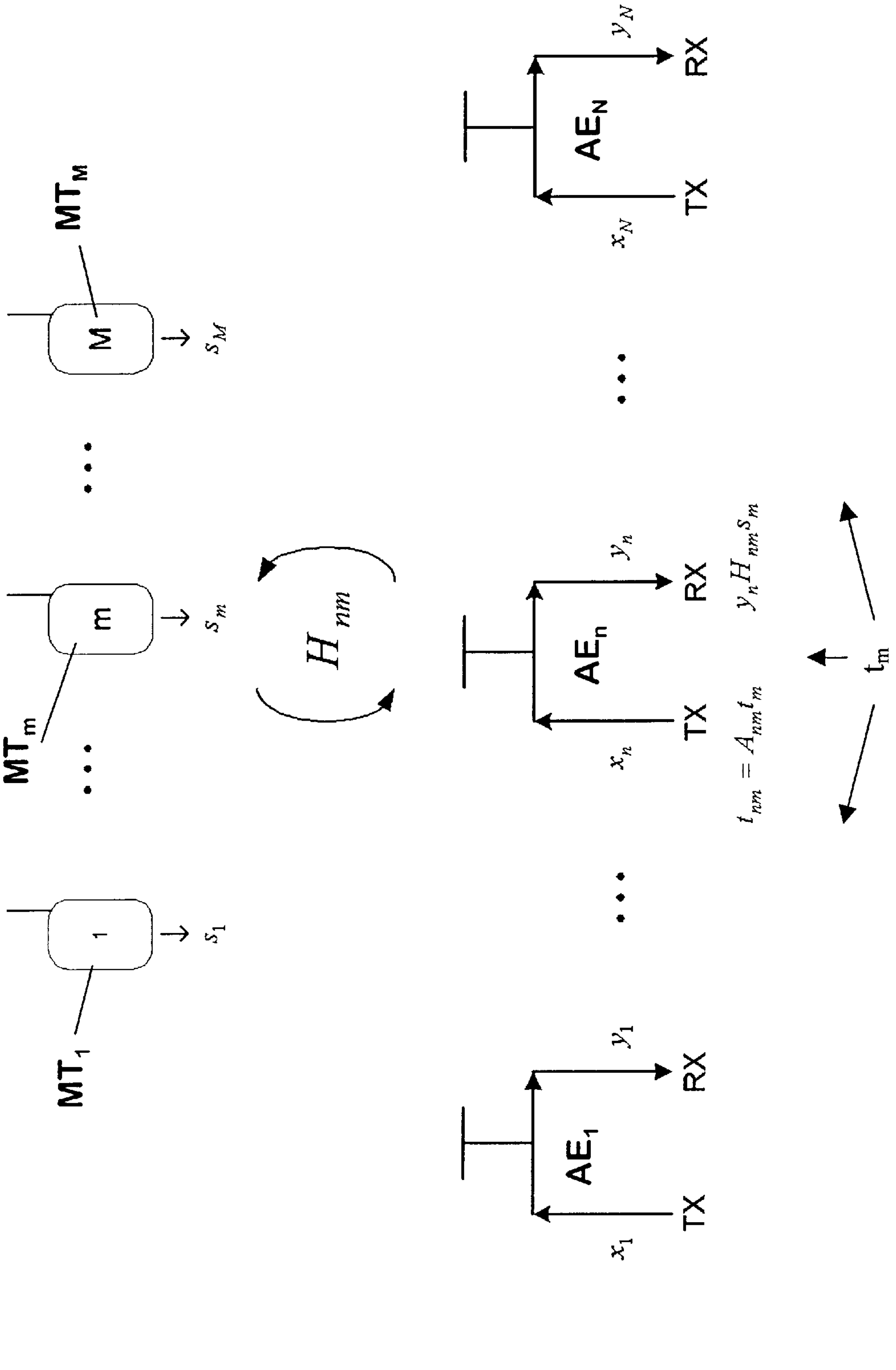
FIG. 5 illustrates for a compensation for nulling the influence of different transfer properties on signals transmitted between a smart antenna array and a plurality of mobile terminals.

FIG. 5 shows a part of a wireless communications system with N antenna elements $AE_1, \ldots, AE_n, \ldots, AE_N$ of a smart antenna array implemented in a base station of a radio access network and M mobile terminals $MT_1, \ldots, MT_m, \ldots, MT_M$ located in the serving area of the base station. Each antenna element $AE_1$–$AE_N$ of the smart antenna array comprises a transmit RX and a receive RX branch. Each mobile terminal $MT_1$–$MT_M$ comprises a single antenna element.

For a channel estimation at the base station, the mobile terminals $MT_1$–$MT_M$ transmit one at a time a known training signal $s_m$ with m=1 to M. The transfer property of the radio channel between the $m^{th}$ mobile terminal $MT_m$ and the $n^{th}$ antenna element $AE_n$ of the base station are denoted $H_{nm}$. If the transfer properties of the receive RX branch of antenna element $AE_n$ are referred to as $y_n$, signals $s_m$ transmitted by mobile terminal $MT_m$ are received at antenna element $AE_n$ with a value of $y_n H_{nm} s_m$, $y_n H_{nm}$ being summarized as $h_{nm}$. The base station transmits mobile station specific signals $t_m$ either consecutively in a single-user smart-antenna operation, or simultaneously in an SDMA operation. In both cases, a weight $w_{nm}$ has to be defined for each antenna element $AE_1$–$AE_N$, according to which the signal $t_m$ is to be transmitted as signal $t_{nm}$ by the antenna element $AE_n$:

$$t_{nm}=A_{nm}t_m=w_{nm}{}^*B_n t_m=t_m(w^H)_{mn}B_n$$

with $$\sum_{n=1}^{N} w_{nm}^* h_{nm'} = \sum_{n=1}^{N} (w^H)_{mn} h_{nm'} = \delta_{mm'}.$$

$B_n$ denotes a complex calibration value that has to be applied to the antenna element $AE_n$, in order to compensate for the different transfer properties of different branches. The antenna weights are defined in a way that the mobile terminal $MT_m$ receives only $t_m$ and not $t_{m'}$ if m'≠m. For an ideal system, it is possible to set, as above, $x_n=y_n=B_n=1$, which results in that the $m'^{th}$ mobile station $MT_{m'}$ receives the signal $$r_{m'}=t_m\delta_{mm'}.$$

Expressed in a more general way, the signal received by an $m'^{th}$ mobile station $MT_{m'}$ is $$r_{m'} = t_m \sum_{n=1}^{N} (w^H)_{mn} B_n x_n H_{nm'} \quad (9)$$

when the base station uses single-user smart-antenna operation. For SDMA, there would have to be in addition a sum over m on the right hand side of equation (9). Defining matrices:

$$r=\mathrm{diag}(r_m)$$

$$t=\mathrm{diag}(t_m)$$

$$w=(w_{nm})$$

$$B=\mathrm{diag}(B_n)$$

$$x=\mathrm{diag}(x_n)$$

$$y=\mathrm{diag}(y_n)$$

$$H=(H_{nm})$$

$$h=(h_{nm}) \quad (10)$$

equation (9) can be written as $$r=tC, \quad (11)$$

where for the M×M matrix C is given by $$C=w^H B\times H=(h^H h)^{-1} h^H B\times H=[(yH)^H yH]^{-1}(yH)^H B\times H==[H^H y^H yH]^{-1} H^H y^H B\times H \quad (12)$$

Here, the second equality results from the requirement for w in FIG. 5. Namely, $w^H$ is the pseudoinverse of h. The third equality of equation (12) results also from the definitions set up for FIG. 5, since h=yH.

For calibration, it is required that matrix C is diagonal. This happens if $$Bx=\rho y, \quad (13)$$

where ρ is a complex scalar. We thus have:

$$B=\rho y x^{-1}=\rho\times\mathrm{diag}(y_n/x_n) \quad (14)$$

Fixing the reference antenna element to antenna element $AE_1$ and therefore choosing $$\rho=x_1 y_1, \quad (15)$$

we find the for the calibration correction:

$$B = \mathrm{diag}\left(\frac{x_1 y_n}{x_n y_1}\right), \quad (16)$$

which corresponds to the result in the cited document "A new calibration method of adaptive array for TDD systems". Note that the phase of B in equation (16) is the same as above in equation (2). In addition, equation (16) provides the values for an amplitude correction:

$$|B_n| = \frac{|x_1||y_n|}{|x_n||y_1|} \quad (17)$$

In a system with four antenna elements $AE_1$–$AE_4$ and the calibration measurements of FIG. 3, the amplitude correction can be determined directly with the measurement results for the gains included in equations (5) and (6). From the measurements of the gains included in equation (7) for the alternative configuration for four antenna elements $AE_1$–$AE_4$ of FIG. 4, the calibration amplitudes also can be found since, for example:

$$|B_3| = \frac{|x_1||y_3|}{|x_3||y_1|} = \frac{|x_1||y_2|\times|x_2||y_3|}{x_3||y_2|\times|x_2||y_1|} = \frac{\Delta_{12}^a\times\Delta_{23}^a}{\Delta_{32}^a\times\Delta_{21}^a} \quad (18)$$

The phase and amplitude errors remaining after calibration can be estimated to be within tolerable limits. Simulations show that these errors cause practically no degradation in single-user smart-antenna operation. Only for SDMA operation, extra care might be needed. With reasonable values for the phase and amplitude tolerances of the used RF components, a residual phase error of well below 10 degrees and an amplitude error of about 1dB can be expected. The used components are furthermore stable in time. Thus, if the calibration system itself is measured and the results are stored in a memory, the calibration accuracy can further be increased.

As a matter of course, the scope of the invention is not restricted to the examples described with reference to FIGS. 1 to 5. The idea of the invention can rather be applied to the calibration of any a smart-antenna array of a wireless access system using time division duplex.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method for calibrating a smart-antenna array of a wireless access system using time division duplex, which smart antenna array comprises at least two antenna elements, each with a transmit and a receive radio frequency branch, the calibrating being based on the evaluation of signals transmitted via the transmit branch of one of the antenna elements and received via the receive branch of another one of the antenna elements respectively, said transmit and receive branches used for the respective transmission being physically interconnected, wherein at least those transmit branches of antenna elements connected to a receive branch of an antenna element that is connected at the same time to a transmit branch of at least one other antenna element are employed in a predetermined order for transmitting broadcast messages in predetermined broadcast periods during which the respective other antenna elements are prevented from transmitting signals.

2. The method of claim 1, wherein the transmitted and received signals are evaluated by determining the phase differences between the received signals and the respective transmitted signals, the determined phase differences being used for determining a value for a phase calibration for each of the at least two antenna elements.

3. The method of claim 2, wherein for calibrating the antenna array a calibration phase for one of N at least two antenna elements is fixed to a value $\hat{B}_1$ and wherein the phases of N−1 further antenna elements are adjusted with calibration phases $\hat{B}_2$ to $\hat{B}_N$, comprising:

evaluating transmitted and received signals by determining their phase differences $\Delta_{ij}$, the first index indicating the respective transmitting and the second index indicating the respective receiving antenna element, both indices i,j lying between 1 and N;

determining the calibration phases $\hat{B}_2$ to $\hat{B}_N$ based on suitable equations $\hat{B}_j-\hat{B}_i=\hat{x}_i-\hat{x}_j-(\hat{y}_i-\hat{y}_j)$, the hat ^ denoting the phase of the respective variable, wherein $x_i$ is the transfer function of the transmit branch of the $i^{th}$ antenna element and wherein $y_j$ is the transfer function of the receive branch of the $j^{th}$ antenna element, and based on suitably determined phase differences $\Delta_{ij}$, the phase differences $\Delta_{ij}$ corresponding to $\hat{x}_i+\hat{y}_j$ and the indices i,j lying between 1 and N.

4. The method of claim 1, wherein the transmitted and received signals are evaluated by determining the gain between received signals and the corresponding transmitted signals, the determined gains being used for determining a value for a amplitude calibration for each of the at least two antenna elements.

5. The method of claim 4, comprising for an amplitude calibration of a smart antenna array with N at least two antenna elements:

evaluating transmitted and received signals by determining the gain $\Delta_{ij}^{a}$ of the respective received signal compared to the respective transmitted signal, the first index indicating the respective transmitting and the second index indicating the respective receiving antenna element, both indices i,j lying between 1 and N;

determining factors $|B_n|$, with n=1 to N, for an amplitude correction for each of said N antenna elements based on the determined gains $\Delta_{ij}^{a}$ and based on the equations:

$$|B_n| = \frac{|x_1||y_n|}{|x_n||y_1|},$$

wherein $x_n$ is the transfer function of the transmit branch of the $n^{th}$ antenna element and wherein $y_n$ is the transfer function of the receive branch of the $n^{th}$ antenna element, the determined gains $\Delta_{ij}^{a}$ corresponding to $|x_i||y_j|$.

6. The method of claim 1, wherein for a calibration of the smart antenna array for nulling operations, a factor for an amplitude correction is determined for each of the at least two antenna elements by evaluating signals transmitted between the transmit branch of one antenna element and the receive branch of another antenna element respectively.

7. A radio transceiver unit for a wireless access system using time division duplex comprising:

a smart antenna array with at least two antenna elements, each including a transmit and a receive branch;

a coupler in the transmit and the receive branch of each antenna element for coupling signals out of the transmit branches and for coupling signals into the receive branches;

a physical connection between the coupler in the transmit branch of each antenna element and the coupler in the receive branch of at least one other antenna element respectively;

selection means for selecting in a predetermined order at least each of those transmit branches of antenna elements connected to a receive branch of an antenna element that is connected at the same time to a transmit branch of at least one other antenna element to be employed for transmitting broadcast messages in predetermined broadcast periods during which the respective other antenna elements are prevented from transmitting signals; and processing means for evaluating signals transmitted via said connections for obtaining calibration information to be used for calibrating the smart antenna array.

8. The radio transceiver unit of claim 7, wherein the processing means are designed for fixing a calibration phase for one of N at least two antenna elements to a value $\hat{B}_1$;

evaluating transmitted and received signals by determining their phase differences $\Delta_{ij}$, the first index indicating the respective transmitting and the second index indicating the respective receiving antenna element, both indices i,j lying between 1 and N; and for determining the calibration phases $\hat{B}_2$ to $\hat{B}_N$ for the N−1 further antenna elements based on suitable equations $\hat{B}_j-\hat{B}_i=\hat{x}_i-\hat{x}_j-(\hat{y}_i-\hat{y}_j)$, the hat ^ denoting the phase of the respective variable, wherein $x_i$ is the transfer function of the transmit branch of the $i^{th}$ antenna element and wherein $y_j$ is the transfer function of the receive branch of the $j^{th}$ antenna element, and based on suitably determined phase differences $\Delta_{ij}$, the phase differences $\Delta_{ij}$ corresponding to $\hat{x}_i+\hat{y}_j$ and the indices i,j lying between 1 and N.

9. The radio transceiver unit of claim 7, wherein the processing means are designed for evaluating transmitted and received signals by determining the gain $\Delta_{ij}^a$ of the respective received signal compared to the respective transmitted signal, the first index indicating the respective transmitting and the second index indicating the respective receiving antenna element, both indices i,j lying between 1 and N, wherein N is the number of the at least two antenna elements; and for determining a factor $|B_n|$ with n=1 to N for an amplitude correction for each of the N antenna elements based on the determined gains $\Delta_{ij}^a$ and on equations:

$$|B_n| = \frac{|x_1||y_n|}{|x_n||y_1|},$$

wherein $x_n$ is the transfer function of the transmit branch of the $n^{th}$ antenna element and wherein $y_n$ is the transfer function of the receive branch of the $n^{th}$ antenna element, the determined gains $\Delta_{ij}^a$ corresponding to $|x_i||y_j|$.

10. A calibrating system for calibrating a smart antenna array with at least two antenna elements of a wireless access system using time division duplex, each antenna element including a transmit and a receive branch, the system comprising:

a directional coupler in the transmit and the receive branch of each antenna element for coupling signals out of the transmit branches and for coupling signals into the receive branches;

a physical connection between the coupler in the transmit branch of each antenna element and the coupler in the receive branch of at least one other antenna element respectively;

selection means for selecting in a predetermined order at least each of those transmit branches of antenna elements connected to a receive branch of an antenna element that is connected at the same time to a transmit branch of at least one other antenna element to be employed for transmitting broadcast messages in predetermined broadcast periods during which the respective other antenna elements are prevented from transmitting signals; and processing means for evaluating signals transmitted via said connections for obtaining calibration information to be used for calibrating the smart antenna array.

11. The calibrating system unit of claim 10, wherein the processing means are designed for fixing a calibration phase for one of N at least two antenna elements to a value $\hat{B}_1$;

evaluating transmitted and received signals by determining their phase differences $\Delta_{ij}$, the first index indicating the respective transmitting and the second index indicating the respective receiving antenna element, both indices i,j lying between 1 and N; and for determining the calibration phases $\hat{B}_2$ to $\hat{B}_N$ for the N−1 further antenna elements based on suitable equations $\hat{B}_j-\hat{B}_i=\hat{x}_i-\hat{x}_j-(\hat{y}_i-\hat{y}_j)$, the hat ^ denoting the phase of the respective variable, wherein $x_i$ is the transfer function of the transmit branch of the $i^{th}$ antenna element and wherein $y_j$ is the transfer function of the receive branch of the $j^{th}$ antenna element, and based on suitably determined phase differences $\Delta_{ij}$, the phase differences $\Delta_{ij}$ corresponding to $\hat{x}_i+\hat{y}_j$ and the indices i,j lying between 1 and N.

12. The calibrating system unit of claim 10, wherein the processing means are designed for evaluating transmitted and received signals by determining the gain $\Delta_{ij}^a$ of the respective received signal compared to the respective transmitted signal, the first index indicating the respective transmitting and the second index indicating the respective receiving antenna element, both indices i,j lying between 1 and N, wherein N is the number of the at least two antenna elements; and for determining a factor $|B_n|$ with n=1 to N for an amplitude correction for each of the N antenna elements based on the determined gains $\Delta_{ij}^a$ and on equations:

$$|B_n| = \frac{|x_1||y_n|}{|x_n||y_1|},$$

with n=1 to N, wherein $x_n$ is the transfer function of the transmit branch of the $n^{th}$ antenna element and wherein $y_n$ is the transfer function of the receive branch of the $n^{th}$ antenna element, the determined gains $\Delta_{ij}^a$ corresponding to $|x_i||y_j|$.

* * * * *